United States Patent [19]

Szabo

[11] Patent Number: 4,885,526
[45] Date of Patent: Dec. 5, 1989

[54] COMPENSATION CIRCUIT FOR ELECTRICAL GENERATORS

[75] Inventor: Leslie I. Szabo, Budapest, Hungary

[73] Assignee: Electro Erg Limited, Budapest, Hungary

[21] Appl. No.: 172,274

[22] Filed: Mar. 23, 1988

[51] Int. Cl.[4] .......................... H02K 1/10; H02P 9/10
[52] U.S. Cl. ......................................... 322/66; 322/46; 310/168; 310/183
[58] Field of Search ............... 310/168, 183, 156, 201; 322/46, 66, 100

[56] References Cited

U.S. PATENT DOCUMENTS

| | | | |
|---|---|---|---|
| 2,218,859 | 10/1940 | Schweitzer Jr. | 322/46 X |
| 2,767,368 | 10/1956 | Kober | 322/46 X |
| 3,913,004 | 10/1975 | Alexander | 321/28 |
| 4,716,329 | 12/1987 | Oh | 310/183 |

FOREIGN PATENT DOCUMENTS 8202126 6/1982 World Int. Prop. O. .

Primary Examiner—Robert J. Hickey
Attorney, Agent, or Firm—Riches, McKenzie & Herbert

[57] ABSTRACT

A compensation circuit for electrical generators is disclosed. In an electrical generator, the electrical current generated in the armature coil induces a magnetic flux in the flux path of the generator. The compensating circuit of the invention includes a conductor that surrounds a portion of the flux path of the generator. This conductor known as the compensating coil, is supplied with a compensating circuit which has a reactive component. The compensating current induces a secondary magnetic flux that has a component that opposes the flux induced by the armature current. In a further embodiment of the invention, a twin generator—generator or twin generator—motor is employed. The compensating coil surrounds the flux path of one of the generators and the other generator or motor is used to supply compensating current to the compensating coil.

18 Claims, 6 Drawing Sheets

COMPENSATION CIRCUIT FOR ELECTRICAL GENERATORS

BACKGROUND OF THE INVENTION

This invention relates to a method and device for improving the efficiency of electricity generators.

In the past, electricity generators have suffered from some loss of efficiency as a result of magnetic flux distortion created by the generated current in the generator.

In a typical generator, there is a magnetic flux path passing through a stator and through a rotor. As a primary magnetic flux varies in the flux path, an electric voltage and, when the circuit is closed, an electric current is induced in a conductor that surrounds, or is coiled about, a portion of the flux path. This conductor is usually referred to as an armature coil. As the induced current varies in the armature coil, a second magnetic flux is induced in the magnetic flux path by the induced current. The second magnetic flux will be referred to as the "generated flux" or as the "secondary flux". The generated flux distors the primary magnetic flux when the induced current in the armature coil has an ohmic component.

In the event current is absent in the armature coil, or when the armature coil is short circuited, or the load across the armature coil is purely reactive, the primary magnetic flux, at a pole face between the stator and rotor, is symmetrical about the centre of the face. Thus, the magnetic attraction between the rotor pole and the stator pole is symmetrical about the centre of the pole face. Thus, the energy stored by moving the rotor pole face towards and into alignment with the stator pole face is the same as the energy expended in moving the rotor pole face out of alignment and away from the stator pole face. Therefore, other than frictional, windage and iron losses, the energy required to rotate the rotor is zero when only the primary magnetic flux is in the flux path or when the magnetic flux pattern or shape is made symmetrical across the face of the pole.

However, when the primary magnetic flux is distorted by the generated flux induced in the armature coil, the magnetic flux is no longer symmetrical across the pole face between the stator and rotor. Thus, the energy stored in moving the rotor pole face towards and into alignment with a stator pole face is no longer equal to the energy required to move the rotor pole face out of alignment and away from the stator pole face. Thus, additional energy is required to rotate the rotor when current having an ohmic component is induced in the armature coil. The power required to rotate the rotor when current is induced in the armature coil, as compared to the power input when there is no current induced in the armature coil, will be referred to as the "distorted power input requirement".

SUMMARY OF THE INVENTION

In order to reduce the amount of energy required to rotate the rotor and, therefore, reduce the amount of eeergy required to generate electric power, the distortion of the magnetic flux across the pole faces must be eliminated or at least reduced.

According to this invention, the distortion of the magnetic flux can be eliminated or at least reduced by using a compensating conductor or coil that surrounds, or is coiled about, a portion of the magnetic flux path. A compensating electric current is passed through the compensating coil such that a magnetic flux, referred to as the compensating flux, is induced by the current in the compensating coil. The compensating flux has a component that opposes the generated or secondary flux induced by the generated current in the armature coil.

In order to eliminate the distortion of the magnetic flux caused by the generated flux, the component of the compensating flux opposing the generated flux should equal the generated flux. If the opposing component of the compensating flux is less than the generated flux, the distortion of the magnetic flux will be reduced but not fully eliminated.

If the distortion of the magnetic flux is fully eliminated by the compensating coil, the power input requirement to the rotor is reduced to zero (excluding frictional, windage and iron losses), and there is complete or 100% compensation. However, if the distortion of the magnetic flux is not fully eliminated by the compensating coil, the power input requirement to the rotor is reduced to something greater than zero and there is partial compensation.

When the effect of the generated flux is reduced by the operation of the compensating coil, whether it is complete or partial compensation, the power input required to rotate the rotor, as compared to the power input when there is no current in either the armature coil or the compensating coil, will be referred to as the "compensated input power requirement".

The amount of reduction in the power input requirement as a result of compensation is the difference between the distorted input power requirement and the compensated input power requirement. The amount of reduction in the power input as a result of compensated is referred to as the "reduction in input power requirement".

For complete compensation, the amount of reduction is the same as the distorted input power requirement. For partial compensation, the amount of reduction may range from just over zero to just under the distorted input power requirement.

In order that the compensation current may flow in the compensation coil, electrical power must be delivered to the compensating coil and a voltage is developed across the compensation coil. This electrical power will have a reactive component and may, or may not, have a real, or ohmic, component.

In order to ensure that the compensation as described above is worthwhile from an economics or energy savings point of view, the ohmic or real power delivered to the compensating coil must be less than the reduced input power requirement caused by the compensating coil. In other words, the real power delivered to the compensation coil is less than the amount by which the input power to the rotor is reduced from the distorted power input requirement when there is armature current but no compensation current to the situation where there is armature current and compensation current.

One way to achieve this goal is to supply to the compensating coil electric current that has a reactive component relative to the voltage across the conpensation coil.

Further aspects of the invention will become apparent upon reading the following detailed description and the drawings which illustrate the invention and embodiments of the invention.

DETAILED DESCRIPTION OF PREFERRED EMBODIMENTS OF THE INVENTION

Figure 1:
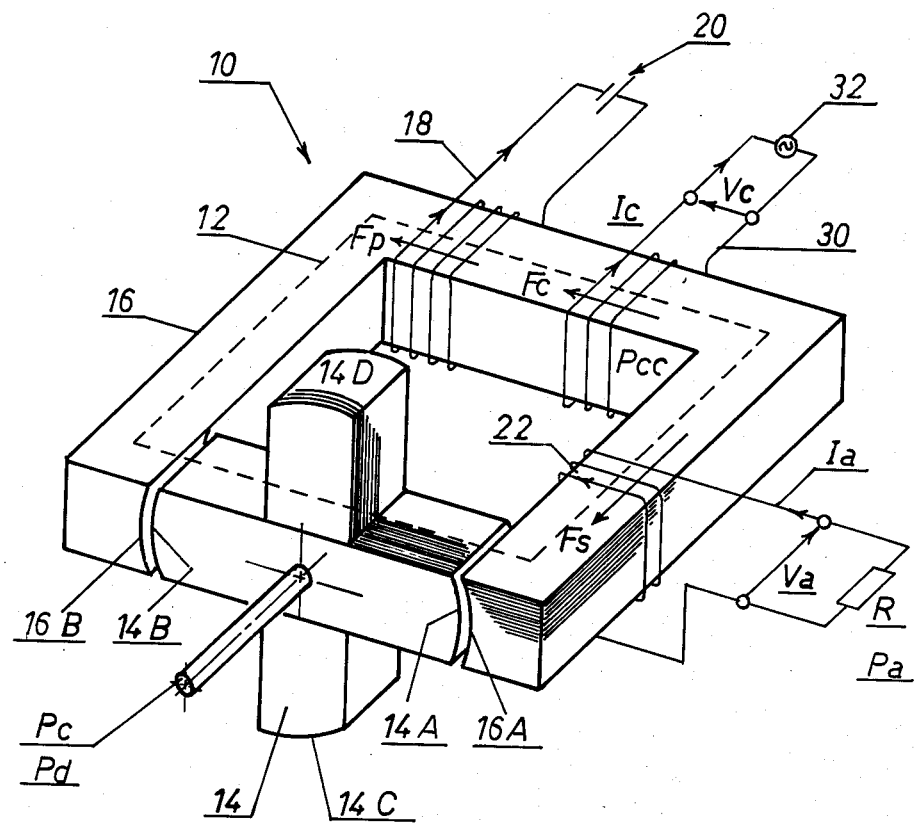
FIG. 1 is a schematic, perspective view of an embodiment of a compensation circuit of this invention.

FIG. 1 illustrates a representative alternating-current, electricity generator which includes an embodiment of the compensation circuit of the present invention. The generator 10 includes a magnetic flux path 12 through which magnetic flux may pass. Typically, the flux path 12 comprises a otor 14 and a stator 16, which are both made from a magnetic material such as iron.

A primary magnetic flux Fp (boldface represents vectors) is created and caused to pass through the magnetic flux path 12 by means of any convenient source. In FIG. 1, the primary flux Fp is shown as being created by induction through an excitation coil 18 with an excitation power supply 20. It is possible that the primary flux Fp could be created by a permanent magnet.

An armature coil 22 is coiled around, or otherwise surrounds, a portion of the flux path 12. When the primary flux Fp in the flux path 12 is caused to vary, within the coils of the armature coil 22, a voltage Va is generated across the armature coil 22. In the generator shown at FIG. 1, the variation in the primary flux Fp is caused by the rotation of the rotor 14. As the rotor 14 rotates, tne flux path 12 is completed when the rotor poles 14A, 14B, 14C or 14D are in alignment with the stator poles 16A, 16B. However, the flux path 12 is broken when the rotor 14 and the rotor pole faces 14A to 14D are no longer in alignment with the stator poles 16A, 16B.

When the flux path 12 is broken, the primary flux Fp will vary in the flux path 12, thus generating voltage Va across the armature coil.

If an ohmic load R, or other load whether capacitive or inductive, is connected to the armature coil 22, a current Ia will flow in the armature coil 22 through the load R, or other load.

If the current Ia flows through the armature 22, according to Lenz' law, a secondary magnetic flux Fs is induced in the magnetic flux path 12. The secondary magnetic flux Fs has a component opposite to the direction of the primary flux Fp.

If there is no current Ia flowing in the armature coil 22, if the armature coil 22 is short-circuited, or if the load is purely reactive, the pattern of the primary flux Fp between the stator 16 and the rotor 14 at the pole faces, for example 16A and 14A in FIG. 1, is symmetrical across the pole face. Thus, the magnetic attraction between the rotor pole and the stator pole is symmetrical about the pole face. Thus, the energy stored by moving the rotor pole, for example 14A, towards and into alignment with the stator pole face, for example 16A, is the same as the energy expended in moving the rotor pole face 14A out of alignment and away from the stator pole face 16A. Therefore, other than frictional, windage and iron losses, the energy required to rotate the rotor 14 is zero when only the primary magnetic flux Fp is in the flux path 12 or if the total magnetic flux in flux path 12 is made to be symmetrical about the pole face.

However, when there is current Ia in the armature coil 22 having an ohmic component, the secondary flux Fs will cause a distortion of the magnetic flux passing through the pole faces. Accordingly, the magnetic flux is no longer symmetrical across the pole faces between the stator 16 and rotor 14. Thus, the energy stored in moving the rotor pole face, for example 14A towards and into alignment with the stator pole face, for example 16A is no longer equal to the energy required to move the rotor pole face 14A out of alignment and away from the stator pole face 16A. Thus, additional energy is required to rotate the rotor 14 when current Ia having an ohmic component is induced in the armature coil 22. The power Pd required to rotate the rotor 14 when current Ia is induced in the armature coil 22 (and when the invention is not used) will be referred to as the "distorted power input requirement".

A compensation coil 30 is shown in FIG. 1. The compensation coil 30 is coiled around, or otherwise surrounds, a portion of the magnetic flux path 12. The compensation coil 30 is connected to a power source 32 and a compesation voltage Vc is developed across compensation coil 30.

When current Ic flows in the compensation coil 30, a compensating magnetic flux Fc is induced which has a component that opposes the secondary magnetic flux Fs that was induced by current Ia in Vc armature coil 22.

The power source 32 supplies the compensating current Ic to the compensating coil 30. The compensating current Vc. has a reactive component relative to the compensating voltage Vc.

In order to eliminate the distortion of the magnetic flux caused by the secondary magnetic flux Fs, the component of the compensating flux Fc which opposes the secondary flux Fs should equal the secondary flux Fs. If the opposing component of the compensating flux Fc is less than the secondary flux Fs, the distortion of the magnetic flux in the flux path 12 will be reduced but not fully eliminated.

As a result of the compensating flux Fc generated by the compensating coil 30 the power input requirement to rotate the rotor 14 is reduced.

Figure 2:
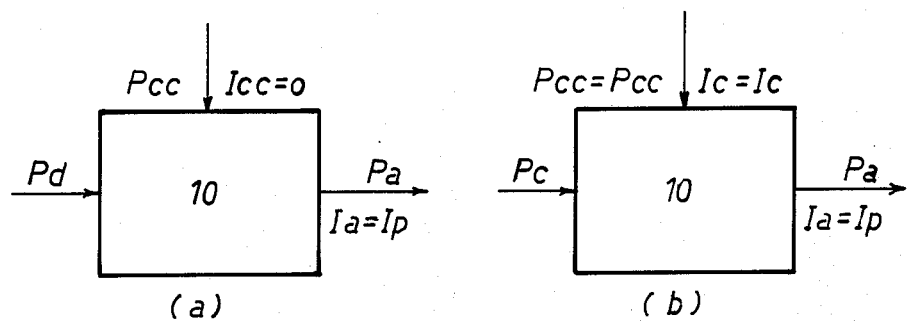
FIG. 2 is a schematic representation of various relationships regarding the invention.

As shown schematically in FIG. 2, a distorted input power requirement Pd is required to rotate the rotor 14 of generator 10 when a prescribed current Ip of armature current Ia flows in the armature coil 22 and no compensating current Ic flows in the compensating coil 30. Also, a compensated input power requirement Pc is defined to be the input power requirement required to rotate the rotor 14 of the generator 10 when the prescribed current Ip of armature current Ia flows in the armature coil 22 and compensating current Ic flows in the compensating coil 30. The difference between the distorted input power requirement Pd and the compensated input power requirement Pc is referred to as the reduction in input power requirement Pred. Thus, we have the relationship Pred=Pd−Pc.

In order to make compensation by compensation coil 30 as efficient as possible from an economics or an energy-saving point of view, the real power Pcc delivered to the compensating coil 30 should be less than the saving in input power requirement Pred gained by using the compensating coil 30. Thus, Real Pcc<Pred=Pd−Pc.

Preferably, the real component of the electric power Pcc to the compensation coil 30 is as close to zero as possible.

Figure 3:
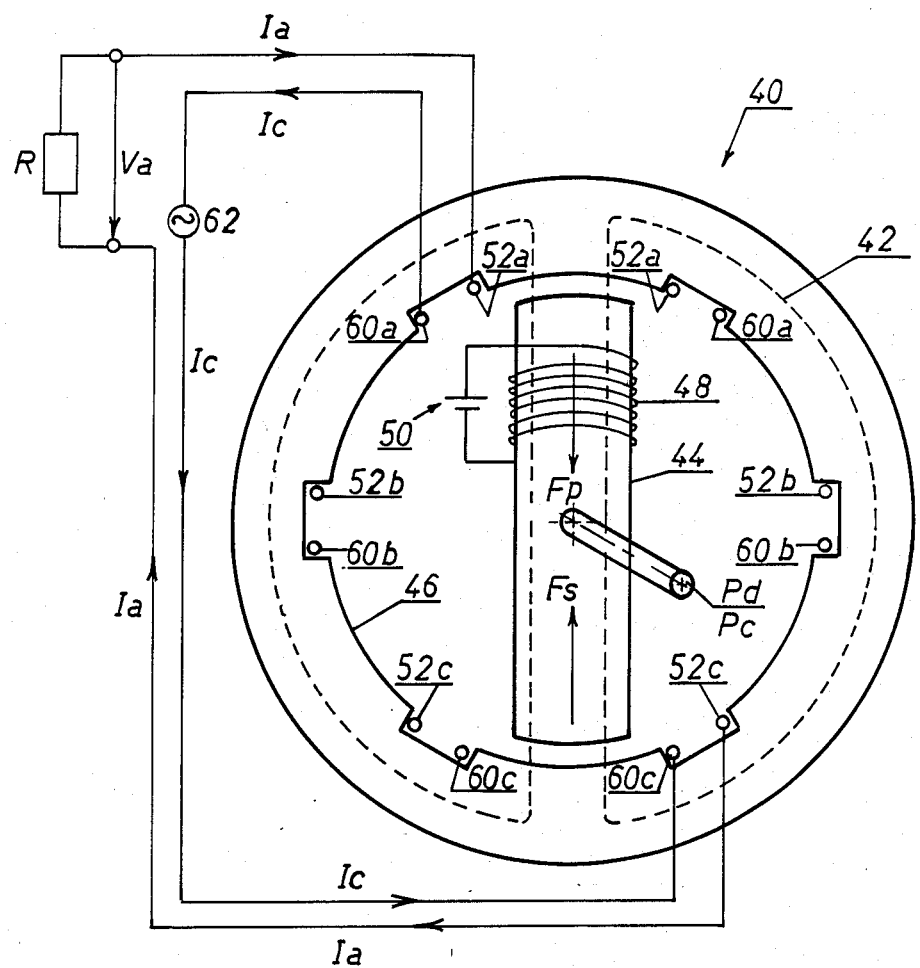
FIG. 3 is a schematic, plan view of another embodiment of a compensation circuit of the invention.

Another representative embodiment of an alternating-current, electricity generator is shown in FIG. 3. The electrical generator 40 in FIG. 3 includes a magnetic flux path 42 through which magnetic flux may pass. Typically, the magnetic flux path 42 comprises a rotor 44 and a stator 46.

A primary magnetic flux Fp is created and caused to pass through the magnetic flux path 42 by means of any convenient source. In FIG. 3, the primary flux Fp is shown as being created by induction through an excitation coil 48 and an excitation power supply 50.

An armature coil 52 is coiled around, or otherwise surrounds, a portion of the flux path 42. The armature coil 52 comprises individual coils 52a, 52b, and 52c as representative coils.

As was the case in the embodiment of FIG. 1, when the primary flux Fp is caused to vary within the coils of the armature coil 52, a voltage Va is generated across the armature coil 52.

If an ohmic Ia R, or any other load, is connected to the armature coil 52, a current Ia will flow in the armature coil 52 through the load R, or the any other load.

If the current Ia flows through the armature coil 52, according to Lenz' law, a secondary magnetic flux Fs is induced in the magnetic flux path 42 which has a component opposite to the direction of the primary flux Fp. As described with respect to the electrical generator of the embodiment of FIG. 1, the secondary magnetic flux Fs generated by current Ia when it has an ohmic component distorts the symmetry of the magnetic flux pattern across the pole faces which results in a distorted input power requirement Pd.

A compensation coil 60 is shown in FIG. 3. The compensation coil 60 is coiled about, or otherwise surrounds, the magnetic flux path 42. The compensation coil 60 comprises individual coils 60a, 60b, 60c. The compensating coil 60 is connected to a power source 62.

When current Ic flows in the compensating coil 60, a compensating magnetic flux Fc is induced which has a component which opposes the secondary magnetic flux Fs induced by the armature current Ia in the armature coil 52.

As with the embodiment of the invention shown in FIG. 1, the power source 62 supplies to the compensating coil 60 the compensating current Ic and the compensating current has a reactive component.

The embodiment of the invention as described with respect to the embodiment of FIG. 3 operates on the same principles as discussed above with respect to the embodiment of FIG. 1.

Considering now either embodiment, the power supplied to the compensating coil 30 or 60 by the power source 32 or 62 has a reactive component and may, or may not, have a real component. If there is a real component of the compensating current Ic, preferably the reactive component is greater than the real component. Most preferably, the compensating current Ic has substantially only a reactive component and substantially no real component.

When voltage Va is generated across the armature coil 22 or 52 and armature current Ia flows in the armature coil 22 or 52, power Pa is delivered to the load R. Preferably, the real power Pa delivered by the armature coil 22 or 52 is greater than the real component of power Pcc delivered to the compensating coil 30 or 60.

The present invention has particular application in generators having substantially no Lorentz force. In no Lorentz force generators, the current Ia flowing through armature coil 22 or 52 does not cut through the magnetic flux path 12 or 42. Moreover, preferably, the compensating current Ic flowing through the compensating coil 30 or 60 does not cut the magnetic flux path 12 or 42.

In a preferred embodiment of the invention, electric power Pa is generated in the armature coil 22 or 52. The electric power Pa generated in the armature has a reactive component and a real component. Preferably, the real component of the armature power Pa in the armature coil 22 or 52 is greater than the real component of the power Pcc delivered to the compensating coil 30 or 60.

In a preferred embodiment of the invention, the generator 10 or 40 has a real power input Pi required to generate a prescribed amount of output power Pa in the armature coil 22 or 52. The real power input requirement Pi comprises the input power requirement required to rotate the rotor 14 or 44, either Pd or Pc, plus the electric power Pcc delivered to the compensation coil 30 or 60. Preferably, the real power input requirement Pi of the generator 10 or 40 is less when compensating current Ic flows in the compensating coil 30 or 60 than when no compensating current Ic flows in the compensating coil 30 or 60.

The present invention can be described in terms of various physical characteristics associated with operation of the generator 10 or 40 in association with the compensation coil 30 or 60 as follows:

Va is the voltage induced across the armature coil 22 or 52;

Vc is the voltage developed across the compensating coil 30 or 60;

Ia is the current in the armature coil 22 or 52;

Ic is the current in the compensating coil 30 or 60;

AV is the electrical angle from the voltage Va to the voltage Vc;

AA is the electrical angle from the voltage Va to the current Ia in the armature coil 22 or 52; and AC is the electrical angle from the voltage Vc to the current Ic in the compensating coil 30 or 60.

Figure 5:
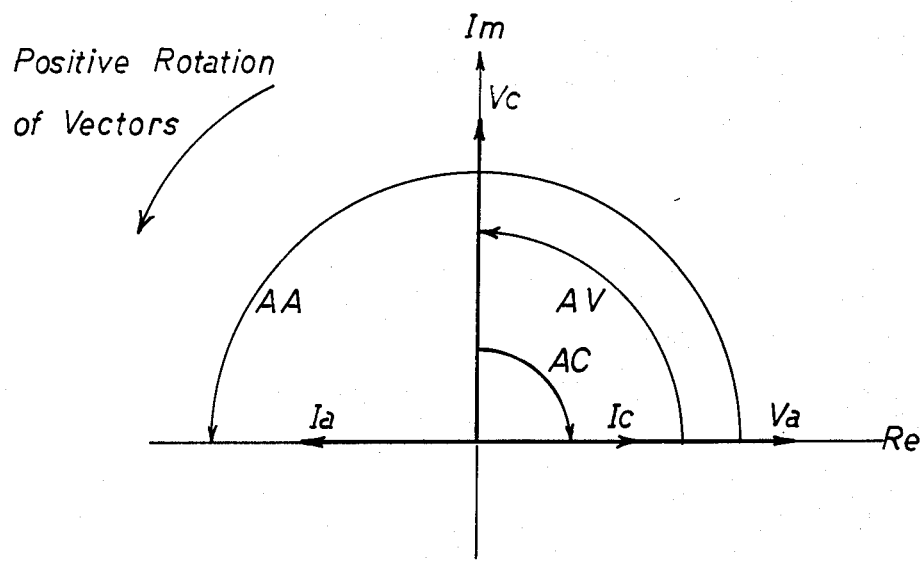
FIG. 5 and 6 are phasor diagrams representing relationships between various characteristics of an embodiment of the invention.

When the compensating voltage Vc leads the armature voltage Va by an amount of electrical measure ranging from 0° to 90°, the relative orientation in electrical measure of the corresponding currents Ic and Ia can be seen schematically in FIG. 5. Thus, compensating voltage Vc leads compensating current Ic, and so the angle AC between these two is negative. Also, armature current Ia leads armature voltage Va, and so the angle AA between these two is positive.

In this situation where compensating voltage Vc leads armature voltage by an angle ranging from 0° to 90°, the angle AC between the compensating voltage Vc and the compensating current Ic could range from −315° to 45°. Also, the angle AA between the armature voltage Va and the armature current Ia could range from 90° to 270°.

If the compensating coil 30 or 60 is made to operate with reactive current Ic, when the compensating voltage Vc leads the armature voltage Va from between 0° to 90°, compensating current Ic will lag compensating voltage Vc from between −225° to −135° or from −45° to 45°.

Also, armature current Ia will lead armature voltage Va from between 135° to 225°.

Figure 6:
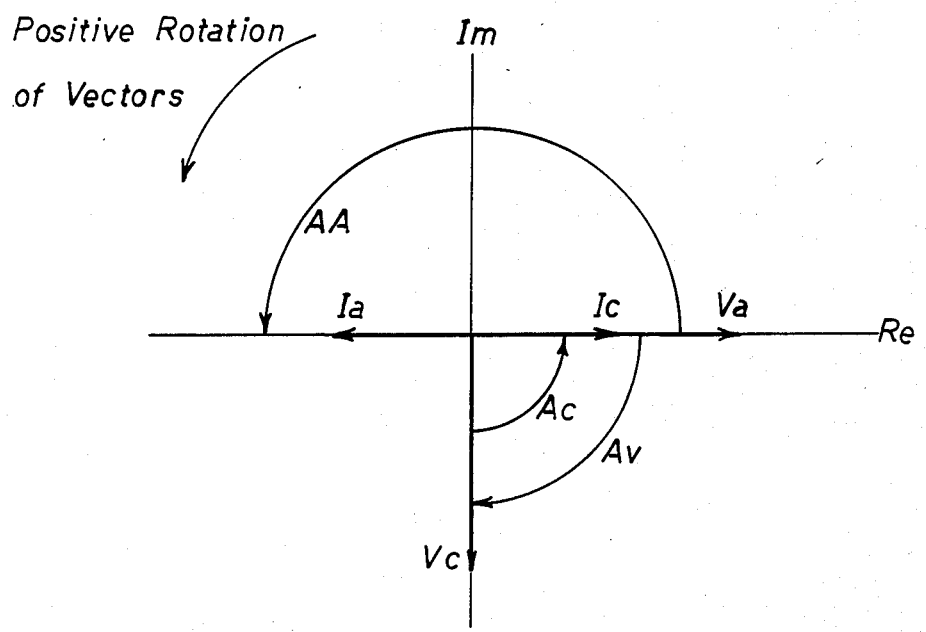

When the compensating voltage Vc lags the armature voltage Va by an amount of electrical measure ranging from 0° to 90°, the relative orientation in electrical measure of the corresponding currents Ic and Ia can be seen schematically in FIG. 6. Thus, compensating voltage Vc lag compensating current Ic, and so the angle AC between these two is positive. Also, armature current Ia leads armature voltage Va, and so the angle AA between these two is positive.

In this situation where compensating voltage Vc lags armature voltage Va by an angle ranging from 0° to 90°, the angle AC between the compensating voltage Vc and the compensating current Ic could range from −45° to 315°. Also, the angle AA between the armature voltage Va and the armature current Ia could range from 90° to 270°.

If the compensating coil 30 or 60 is made to operate with reactive current Ic, when the compensating voltage Vc lags the armature voltage Va from between 0° to 90°, compensating current Ic will lag compensating voltage Vc from between −45° to +45° or from 135° to 225°.

Also, armature current Ia will lead armature voltage Va from between 135° to 225°.

Thus, in the compensation mode when compensating coil 30 or 60 is in operation, the following relationships will be satisfied:

when:
$$0° \leq AV \leq +90°$$
$$-45° \leq AC \leq +45° \text{ or } -225° \leq AC \leq -135°$$
$$+135° \leq AA \leq +225°$$
and when:
$$-90° \leq AV \leq 0°$$
$$-45° \leq AC \leq +45° \text{ or } +135° \leq AC \leq +225°$$
$$+135° \leq AA \leq +225°$$

Another aspect of the invention resides in providing a suitable means for supplying to the compensating coil 30 or 60 a compensating current Ic having a reactive component.

Figure 4:
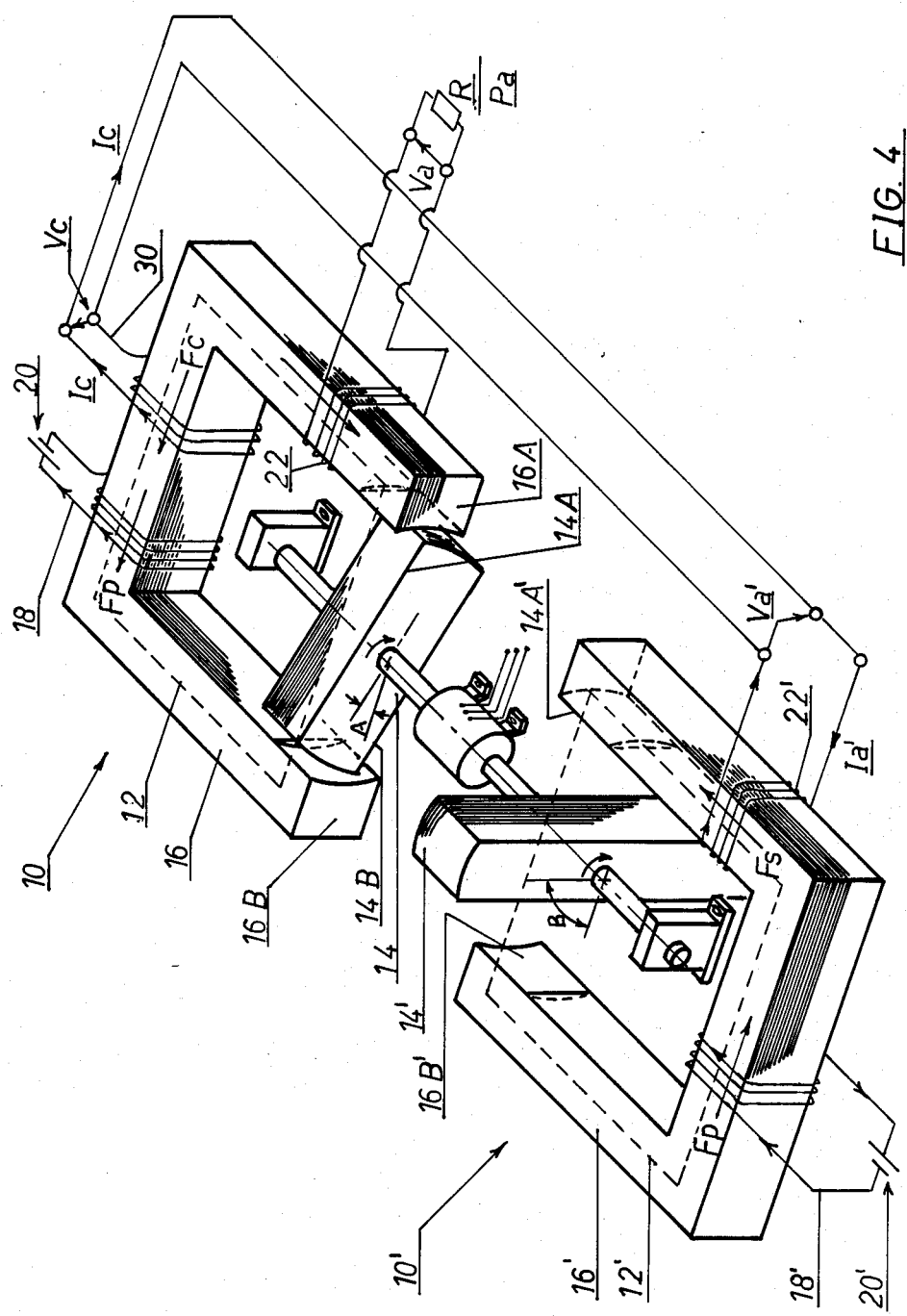
FIG. 4 is a schematic, perspective view of an embodiment of a twin generator set, or twin generator-motor set, of the invention.

Preferably, the invention comprises "twin generators" such that the means for supplying the compensating current Ic to a generator such as generator 10 as shown in FIG. 1 is a second similar generator 10' as shown in FIG. 4.

Generator 10 from FIG. 1 is shown as one generator of a set of twin generators 10 and 10' as shown in FIG. 4. Generator 10' has similar features as described above with respect to generator 10. Primed numerals respecting generator 10' correspond to features on generator 10' that are the same as or substantially similar to those shown and described respecting generator 10.

Thus, excitation coil 18' in generator 10' induces a primary flux Fp' in the magnetic flux path 12' which generates an armature voltage Va' in the armature coil 22' which is coiled around, or otherwise surrounds, the magnetic flux path 12'.

The output of armature coil 22' of generator 10' is connected to the compensatnng coil 30 on generaror 10. Thus, generator 10' is acting as the power source 32 as shown in FIG. 1. Also, the current Ia' generated by generator 10' is acting as the compensating current Ic as shown in FIG. 1. In FIG. 4, the armature current Ia' from generator 10' is the compensating current Ic delivered to the compensating coil 30.

Because generator 10 is electrically connected to generator 10' through the armature current Ia' of the generator 10', the physical orientation of the rotor 14' of generator 10' with respect to the stator poles 16A',16B' of stator 16' of generator 10', as compared to the physical orientation of the rotor 14 of generator 10 with respect to the stator poles 16A, 16B of the stator 16, will affect the efficiency of compensation. This is because the rotor 14' of generator 10' relatively leads or lags the rotor 14 of generator 10, the respective voltages Va and Va' will have different phases. Thus, the respective armature current Ia and Ia' will have different phases. Because Ia'=Ic, the secondary flux Fs induced by armature current Ia will have a different phase than the compensating flux Fc induced by compensating current Ic=Ia'.

If the line between the centre of the pole faces of a given stator is taken as the reference line, the rotor 14 of generator 10, at any given time, will be at an angle A to the reference line between stator poles 16A and 16B. Similarily, rotor 14' of generator 10', at any given time, will be at an angle B with respect to the reference line between stator pole faces 6A' and 16B'. Thus, the relative angle between rotor 14 and rotor 14' will be angle C which is angle A minus angle B. Thus, in FIG. 4, rotor 14' leads rotor 14 by an angle of C=A−B.

It has been found that by controlling the relative angle C between the respective rotors 14 and 14', the effects of the compensating coil 30 can be improved. Thus, for given electrical and mechanical characteristics for the generators 10 and 10', and for a given load R, the relative angle C between the respective rotors can improve the efficiency of the compensating coil 30 or 60. Thus, for a given compensating current Ic, there is a greater reduction in the input power required to rotate the rotor 14 at certain angles C than at others.

In a further preferred embodiment of the invention, the invention comprises a twin generator-motor set. In this embodiment, the motor is the same as generator 10' shown in FIG. 4. However, the generator 10' is driven to operate as a synchronous motor which supplies reactive power and current to the compensating coil 30.

Figure 7:
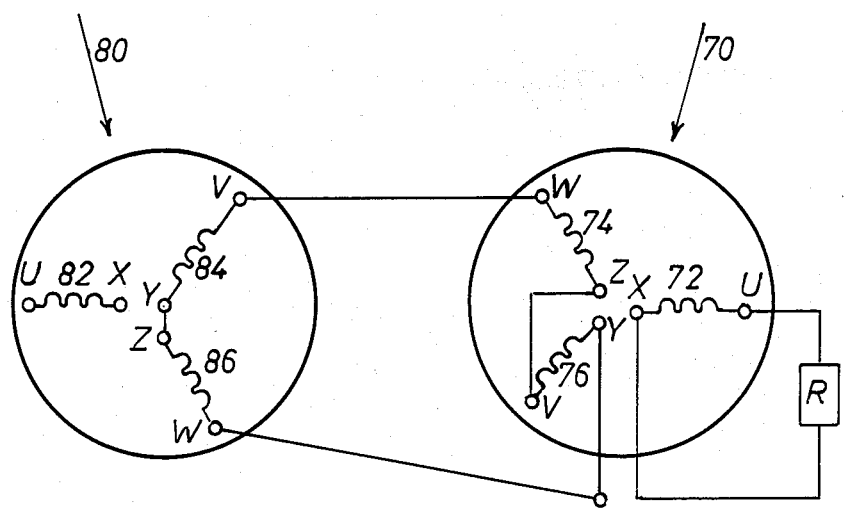
FIG. 7 is a schematic diagram of a further embodiment of a conpensation circuit and a twin generator—generator/motor set of the invention.

In a further preferred embodiment of the invention, as shown in FIG. 7, the generator 70 which is similar to generator 10 or 40, is a three-phase synchronous generator. In particular, one phase of generator 70 is the armature coil 72, and another phase 74 acts as a compensation coil. Preferably, the third phase 76 also acts as part of the compensation coil. Phases 74 and 76 are in series.

In yet a further embodiment of the invention, as shown in FIG. 7, generator/motor 80 is connected to generator 70 and generator/motor 80 supplies compensation current to phases 74 and 76 of generator 70 In particular, phases 84, 86 of generator/motor 80 supply, compensating current to phases 74, 76 of generator 70. Phase 82 of generator/motor 80 is left idle.

Although the disclosure describes and illustrates certain preferred embodiments of the invention, it is to be understood that the invention is not restricted to these particular embodiments. The invention includes all embodiments which are functional, mechanical or electrical equivalents to the embodiments disclosed and illustrated herein.

I claim:

1. An alternating-current, electricity generator comprising:
  a magnetic flux path;
  a first conductor surrounding a portin of the magnetic flux path for generating electric current in the first conductor when magnetic flux varies in the magnetic flux path, wherein the generated current in the first conductor induces a magnetic flux in the magnetic flux path;
  a second conductor surrounding a portion of the magnetic flux path for inducing, when an electric current flows in the second conductor, a compensating magnetic flux which opposes the magnetic flux induced by the generated current in the first conductor;
  means for supplying to the second conductor a compensating current for inducing the compensating magnetic flux, the compensating current having a reactive component;
  wherein the means for supplying the compensating current is a second alternating-current, electricity generator having:
  a second magnetic flux path; and
  a third conductor surrounding a portion of the second magnetic flux path for generating electric current in the third conductor when magnetic flux varies in the second magnetic flux path; and
  wherein the third conductor is electrically connected to the second conductor so that electric current generated in the third conductor is supplied to the second conductor.

2. A generator as defined in claim 1 wherein the first conductor does not cut through the magentic flux path, and the second conductor does not cut through the magnetic flux path.

3. In an aternating-current, electricity generator having a magnetic flux path and a first conductor surrounding a portion of the magnetic flux path for generating circuit current having ohmic component in the first conductor when magnetic flux varies in the magnetic flux path, wherein the generated current inthe first conductor induces a magnetic flux in the magnetic flux path, a compensation circuit comprising:
  a second conductor surrounding a portion of the magnetic flux path for inducing, when an electric current flows in the second conductor, a compensating magnetic flux which opposes the magnetic flux induced by the generated current in the first conductor; and
  means for supplying to the second conductor a compensating current for inducing the compensating magnetic flux, the compensating current having a reactive component;
  wherein the generated current in the first conductor is referred to as Ia;
  wherein the voltage across the first conductor associated with the current Ia is referred toas Va;
  wherein the compensating current in the second conductor is referred to as Ic;
  wherein a voltage across the second conductor associated with the current Ic is referred to as Vc; and
  AV is an angle in electrical measure from the voltage Va to the voltage Vc;
  AA is an angle in electrical measure from the voltage Va to the current Ia; and
  AC is an angle in electrical measuring from the voltage Vc to the current Ic;
  wherein the following relationships are satisfied:

when:
$$0° \leq AV \leq +90°$$
$$-45° \leq AC \leq +45° \text{ or } -225° \leq AC \leq -135°$$
$$+135° \leq AA \leq +225°$$
or when:
$$-90° \leq AV \leq 0°$$
$$-45° \leq AC \leq +45° \text{ or } +135° \leq AC \leq +225°$$
$$135° \leq AA [AC] \leq +225°.$$

4. A compensation circuit as defined in claim 3 wherein the first conductor does not cut through the magnetic flux path; and the second conductor does not cut through the magnetic flux path.

5. In an alternating-current, electricity generator having a magnetic flux path and a first conductor surrounding a portion of the magnetic flux path for generating electric current having ohmic component in the first conductor when magnetic flux varies in the magnetic flux path, wherein the generated current in the first conductor induces a magnetic flux in the magnetic flux path, a compensation circuit comprising:
  a second conductor surrounding a portion of the magnetic flux path for inducing, when an electric current flows in the second conductor, a compensating magnetic flux which opposes the magnetic flux induced by the generated current in the first conductor; and
  means for supplying to the second conductor a compensating current for inducing the compensating magnetic flux, the compensating current having a reactive component, wherein the generator is a three-phase synchronous generator, and a first phase thereof is the first conductor and a second phase therof is the second conductor.

6. A compensation circuit as defined in claim 5 wherein a third phase of the generator is connected in series to the second phase thereof.

7. A compensation circuit as defined in claim 6 wherein the means for supplying the compensating current is three-phase, alternating current electricity generator/motor.

8. A compensation circuit as defined in claim 6 wherein the first conductor does not cut through the magnetic flux path; and the second conductor does not cut through the magnetic flux path.

9. A compensation circuit as defined in claim 5 wherein the first conductor does not cut through the magnetic flux path; and the second conductor does not cut through the magnetic flux path.

10. A compensation circuit as defined in claim 7 wherein the first conductor does not cut through the magnetic flux path; and the second does not cut through the magnetic flux path.

11. In an alternating-current, electricity generator having a magnetic flux path and a first conductor surrounding a portion of the magnetic flux pathfor generating electric current having ohmic component in the first conductor when magnetic flux varies in the magnetic flux path, wherein the generated current in the first conductor induces a magnetic flux in the magnetic flux path, a compensation circuit comprising:
  a second conductor surrounding a portion of the magnetic flux path for inducing, when an electric current flows in the second conductor, a compensating magnetic flux which opposes the magnetic flux induced by the generated current in the first conductor; and means for supplying to the second conductor a compensating current for inducing the compensating magnetic flux, the compensating current having a reactive component;

wherein electric power having a reactive component and a real component is generated in the first conductor of the generator, wherein the means for supplying the compensating current includes means for supplying to the second conductor electric power having a reactive component and a real component less than or equal to the real component of power generated in the first conductor.

12. A compensation circuit as defined in claim 11 wherein the first conductor does not cut through the magnetic flux path; and the second conductor does not cut through the magnetic flux path.

13. In an alternating-current, electricity generator having a magnetic flux path and a first conductor surrounding a portion of the magnetic flux path for generating electric current having ohmic component in the first conductor when magnetic flux varies in the magnetic flux path, wherein the generated current in the first conductor induces a magnetic flux in the magnetic flux path, a compensation circuit comprising:

a second conductor surrounding a portion of the magnetic flux path for inducing, when an electric current flows in the second conductor, a compensating magnetic flux which opposes the magnetic flux induced by the generated current in the first conductor; and means for supplying to the second conductor a compensating current for inducing the compensating magnetic flux, the compensating current having a reactive component;

wherein the induced magnetic flux in the magnetic path that is induced by the current in the first conductor when no current flows in the second conductor causes an increased real power input requirement to the generator;

wherein the means for supplying the compensating current includes means for supplying to the second conductor compensating current for decreasing the real power input requirement to the generator and for supplying to the second conductor electric power having a real component less than a decrease in the real power input requirement to the generator.

14. A compensation circuit as defined in claim 13 wherein the first conductor does not cut through the magnetic flux path; and the second conductor does not cut through the magnetic flux path.

15. A compensation circuit as defined in claim 3 wherein the magnetic flux path passes through a rotor; and wherein a real component of electric power to the second conductor is less than a reduction in input power requirement to the rotor; wherein (a) a distorted input power requirement is required to rotate the rotor when a prescribed current flows in the first conductor and no current flows in the second conductor;

(b) a compensated input power requirement is required to rotate the rotor when the prescribed current flows in the first conductor and compensating current flows in the second conductor; and (c) the reduction in input power requirement is the difference between the distorted input power requirement and the compensated input power requirements.

16. A compensation circuit as defined in claim 15 wherein the first conductor does not cut through the magnetic flux path; and the second conductor does not cut through the magnetic flux path.

17. A compensation circuit as defined in claim 3 wherein the induced magnetic flux in the magnetic path that is induced by the current in the first conductor when no current flows in the second conductor causes an increased real power input requirement to the generator;

wherein the means for supplying the compensating current includes means for supplying to the second conductor compensating current for decreasing the real power input requirement to the generator and for supplying to the second conductor electric power having a real component less than a decrease in the real power input requirement to the generator.

18. A compensation circuit as defined in claim 17 wherein the first conductor does not cut through the magnetic flux path; and the second conductor does not cut through the magnetic flux path.

* * * * *